United States Patent [19]

Shimp

[11] 4,059,550

[45] Nov. 22, 1977

[54] AQUEOUS DISPERSIONS OF POLYHYDROXY POLYETHER RESINS AND AMINOPLAST RESINS

[75] Inventor: David Alan Shimp, Prospect, Ky.

[73] Assignee: Celanese Polymer Specialties Company, Louisville, Ky.

[21] Appl. No.: 703,030

[22] Filed: July 6, 1976

[51] Int. Cl.$^2$ .................. C08L 61/10; C08L 61/28
[52] U.S. Cl. .................. 260/29.4 R; 260/29.2 EP; 260/29.3; 428/418; 428/460
[58] Field of Search .......... 260/29.3, 29.4 R, 29.2 EP; 148/6.15 R, 31.5; 220/64; 428/418

[56] References Cited

U.S. PATENT DOCUMENTS

| | | | |
|---|---|---|---|
| 2,541,027 | 2/1951 | Bradley | 148/6.15 |
| 2,699,413 | 1/1955 | Seagren | 148/31.5 |
| 2,794,754 | 6/1957 | Schroeder | 117/139.4 |
| 2,872,427 | 2/1959 | Schroeder | 260/29.2 |
| 3,245,940 | 4/1966 | Ronay et al. | 260/30.6 |
| 3,578,616 | 5/1971 | Harry | 260/18 |
| 3,879,324 | 4/1975 | Timmons | 260/29.2 |
| 3,908,049 | 9/1975 | Fitko | 427/386 |

*Primary Examiner*—Theodore E. Pertilla
*Attorney, Agent, or Firm*—Herbert P. Price; K. A. Genoni; T. J. Morgan

[57] ABSTRACT

Coating compositions are prepared from aqueous dispersions of polyhydroxy polyether resins and aminoplast or phenolplast resins catalyzed with adducts of phosphoric acid and glycidyl polyethers of polyhydric phenols. The coating compositions are particularly useful as can coatings.

6 Claims, No Drawings

AQUEOUS DISPERSIONS OF POLYHYDROXY POLYETHER RESINS AND AMINOPLAST RESINS

BACKGROUND OF THE INVENTION

The field to which this invention pertains is heat curable coating compositions made from aqueous dispersions of epoxy resins or polyether resins derived therefrom and aminoplast or phenolplast resins.

Aqueous dispersions of polyepoxide resins and processes for making such dispersions are described in U.S. Pat. No. 2,872,427. Such dispersions can contain, in addition to polyepoxide resins, urea-formaldehyde resins and phenol-formaldehyde resins. Curing agents include various acid-acting and alkaline-acting materials.

A process for preparing aqueous dispersions of polyepoxide resins is described in U.S. Pat. No. 3,879,324. However, no curing systems are set forth in this reference.

Heat curable coating compositions made from aqueous dispersions are described in U.S. Pat. No. 3,908,049. These dispersions are made from a major amount of a carboxylic acid containing copolymer and a minor amount of a polyepoxide resin or an aminoplast resin.

U.S. Pat. No. 2,794,754 teaches the preparation of alcohol/water solutions of polyepoxide compounds and methylol compounds using acids, e.g., phosphoric acid, as catalysts. Curable coating compositions made from organic solutions of polyepoxide resins, phenol-formaldehyde resins and phosphoric acid are described in U.S. Pat. No. 2,699,413.

Adducts of polyepoxide resins and phosphoric acid are set forth in U.S. Pat. No. 2,541,027. These adducts are used as curing agents for polyepoxide resins.

SUMMARY OF THE INVENTION

This invention relates to heat curable coating compositions made from aqueous dispersions of complex polyhydroxy polyether resins and aminoplast or phenolplast resins. In particular this invention pertains to coating compositions made from aqueous dispersions of complex polyhydroxy polyether resins having melting points of at least 50° C. and aminoplast or phenolplast resins. More particularly this invention relates to such coating compositions catalyzed by adducts of phosphoric acid and glycidyl polyethers of polyhydric phenols.

The adducts used as catalysts in this invention are prepared by reacting phosphoric acid and a glycidyl polyether of a polyhydric phenol in the ratio of about 1 mol of phosphoric acid for each epoxide group of the glycidyl polyether. These adducts are used in the coating composition in the amount of about 0.1 to about 2 weight percent of phosphoric acid in the catalyst, said percentage being based on the total solids, excluding pigmentation if any, in the coating composition.

The heat curable coating compositions of this invention are stable dispersions of film forming resins which, when formed into coatings, cure at temperatures and times comparable to conventional solvent based coating compositions.

DESCRIPTION OF THE INVENTION

The complex polyhydroxy polyether resins used in this invention contain alternating aromatic and glyceryl nuclei linked through ether oxygens. These resins can be terminated with epoxy (glycidyl) groups, phenolic groups, hydroxyalkyl groups, alkyl or aryl ester groups and alkyl or aryl ether groups. Such resins useful in this invention are those which have a Durrans melting point of at least about 50° C. Preferably the melting point of the resin is about 50° C. to about 150° C., and most preferably about 80° C. to about 135° C.

The complex polyhydroxy polyether resins useful in this invention are derivatives of epihalohydrins and dihydric phenols reacted in various ratios and with or without modifying compounds. The epihalohydrins are epichlorohydrin, epibromohydrin and epiiodohydrin with epichlorohydrin being preferred. The dihydric phenols include resorcinol, hydroquinone, p,p'-dihydroxydiphenyl propane (Bisphenol A), 4,4'-dihydroxy benzophenone, 4,4'-dihydroxy biphenyl, p,p'-dihydroxydiphenyl sulfone and the like. The most preferred dihydric phenol is p,p'-dihydroxydiphenyl propane or Bisphenol A as it is commonly called.

The complex polyhydroxy polyether resins which are terminated with epoxy groups are made by reacting a molar excess of epihalohydrin with a dihydric phenol as described in U.S. Pat. No. 2,615,007 or a molar excess of a diglycidyl ether of a dihydric phenol with additional dihydric phenol as described in U.S. Pat. No. 2,615,008. The molecular weight, melting point and epoxide equivalents weight of such resins can be varied over a wide range by varying the ratio of epihalohydrin or diepoxide to dihydric phenol as is well known in the art. Phenolic terminated complex polyhydroxy polyether resins are made by reacting a molar excess of dihydric phenol with the epihalohydrin or diepoxide as described in U.S. Pat. No. 2,668,805.

Complex polyhydroxy polyether resins containing epoxide termination can also be reacted with a monocarboxylic acid to produce an ester terminated polyhydroxy polyether. Monocaboxylic acids containing 1 to 24 carbon atoms, such as formic acid, acetic acid, propionic acid, 2-ethylhexoic acid, oleic acid, lauric acid, palmitic acid, stearic acid, lignoceric acid and the like, can be used. Generally the amount of acid used will be equivalent to the epoxide content of the resin and the reaction is conducted under such conditions as to bring about carboxy-epoxy reaction but not carboxy-hydroxy reaction. The complex polyhydroxy polyether resins containing epoxide termination can also be ether terminated by reacting the epoxide groups with monohydric phenols and monohydric alcohols under conditions well known in the art.

Hydroxyalkyl ether terminated complex polyhydroxy polyether resins can be made by the procedure described in U.S. Pat. No. 2,558,949 wherein a dihydric phenol is reacted with an epihalohydrin and a monochlorohydrin. Such terminated products can also be obtained by a two step process wherein a phenolic terminated polyhydroxy polyether resin is first made followed by reaction with a monochlorohydrin or a monoepoxide, examples of which include ethylene chlorohydrin, glyceryl monochlorohydrin, propylene chlorohydrin, ethylene oxide, propylene oxide, glycidol, phenyl glycidyl ether, butyl glycidyl ether and the like.

Ester terminated polyhydroxy polyether resins can also be made by reacting a diepoxide, a diphenol and a monocarboxylic acid in the ratio of $n\ 30\ 1$ mols of diepoxide, n mols of diphenol and 2 mols of monocarboxylic acid as described in U.S. Pat. No. 3,247,136. By modifying the above procedure usin n mols of diepoxide, n mols of diphenol and 1 mol of monocarboxylic acid, a polyhydroxy polyether resin containing phenolic termination and ester termination can be made.

The preferred polyhydroxy polyether resin is a Bisphenol A, epichlorohydrin reaction product containing phenolic termination and having a Durrans melting point of about 90° C. to about 130° C.

The dispersants which are used to make the aqueous dispersions are anionic and nonionic surfactants. Examples of anionic surfactants include sodium and potassium alkyl sulfates, aryl sulfates and alkylaryl sulfates and sulfonates; ethoxylated and sulfonated fatty alcohols, e.g., stearyl alcohol and lauryl alcohol; dialkyl esters of alkali metal sulfosuccinic acid salts, e.g., sodium diamyl sulfosuccinate, sodium dihexyl sulfosuccinate and sodium dioctyl sulfosuccinate; and formaldehyde-naphthalene-sulfonic acid condensation products.

A preferred anionic dispersant for use in this invention is an inorganic or organic base salt of a polymeric carboxylic acid having an acid value of at least about 50 up to about 150 before salting. Preferably the acid value will be in the range of about 65 to about 110. The molecular weight of the dispersant combined with the acid value should be such that the salt of the product is soluble or colloidally dispersible in water, or water with a water miscible cosolvent at the temperatures employed in the dispersion process. Useful molecular weights will vary from about 1000 to about 100,000 and, preferably, from about 20,000 to about 50,000.

The preferred polymeric carboxylic acid to be used in this invention is a copolymer of polymerizable ethylenically unsaturated acids, e.g., acrylic and methacrylic acid, with other monomers copolymerizable therewith, e.g., alkyl acrylates and methacrylates wherein the alkyl group contains 1 to 18 carbon atoms, hydroxyalkyl acrylates and methacrylates, styrene, vinyl toluene, acrylonitrile and the like. A particularly preferred polymeric carboxylic acid is made from about 50 to about 70% by weight ethyl acrylate, about 20 to about 30% by weight styrene and about 10 to about 20% by weight acrylic or methacrylic acid.

To form the dispersant, the polymeric carboxylic acid is salted with an organic or inorganic base, e.g., sodium or potassium hydroxide, ammonium hydroxide, or an amine. Useful amines are those which have amine equivalent weights of less than about 150, and can be primary, secondary or tertiary. Examples of amines are ethylamine, propylamine, diethylamine, dipropylamine, triethylamine, tributylamine, morpholine, ethanolamine, ethylene diamine, and the like.

Among the nonionic surfactants used in this invention are polyethers, e.g., polyethylene and polypropylene oxides, which include straight and branched chain alkyl and alkylaryl polyethylene glycol ethers, polypropylene glycol ethers and mixed polyethylene/polypropylene glycol ethers. Examples of such nonionic surfactants are the Igepals, which is a trademark of General Aniline and Film Corporation denoting members of a homologous series of alkylphenoxypoly- (ethyleneoxy)ethanols. Other suitable nonionic surfactants are the "Tweens" which is a trademark of Atlas POwder Company denoting polyoxyalkylene derivatives of hexitol (including sorbitans, sorbides, mannitans and mannides) anhydride and partial long chain fatty acid esters, such as polyoxyalkylene derivatives of sorbitan monolaurate, sorbitan monostearate, etc. Particularly preferred nonionic surfactants are the "Pluronics", which is the trademark of Wyandotte Chemicals Corporation denoting condensates of ethylene oxide with a hydrophobic condensate of propylene oxide and propylene glycol.

The amount of dispersant used in the process of this invention is about 1 to about 25 percent by weight based on the weight of the polyhydroxy polyether resin and, preferably, about 3 to about 10 percent.

Additional components which can be used in this invention are protective colloids added in the amounts of about 0.1 to about 5 percent by weight based upon the total solids weight of the dispersion. Examples of useful protective colloids are starch, casein, gelatin, alginates pectinates, methyl cellulose, hydroxyethyl cellulose, carboxymethyl cellulose, polyvinyl alcohol, sodium or ammonium salts of linear or partially crosslinked acrylic or methacrylic acids, and the like.

The aminoplast and phenolplast resins used to cure the polyhydroxy polyethers can be added during the dispersion process or can be added after the dispersion has been formed. If added during the dispersion process, these resins must be nonreactive with the polyhydroxy polyether resin at the processing temperature. Examples of useful aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of aminoplast resins are methylol urea, dimethoxymethylol urea, butylated polymeric urea-formaldehyde resins, hexamethoxymethyl melamine, methylated polymeric melamine-formaldehyde resin and butylated polymeric melamine-formaldehyde resin. Aminoplast resins and their methods of preparation are described in detail in "Encyclopedia of Polymer Science and Technology", Volume 2, pages 1-91, Interscience Publishers (1965), which is hereby incorporated by reference.

Phenolplast resins, or phenol-aldehyde resins, are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make these phenolplast resins are phenol, o, m, or p-cresol, 2,4-xylenol, 3,4-xylenol, 2,5-xylenol, cardanol, p-tert-butylphenol, and the like. Aldehydes useful in this invention are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1-68, Interscience Publishers (1969), which is hereby incorporated by reference.

If the aminoplast or phenolplast resin is added during the dispersion process, it can be water soluble or water insoluble. If post added, water soluble resins can be added simply by blending and dissolving them into the aqueous dispersion medium. Water insoluble resins can be added to the dispersions as an aqueous dispersion. Aminoplast and phenolplast resins are utilized in the amount of about 5 to about 40 percent by weight based on the weight of the polyhydroxy polyether resin.

The aqueous dispersions of complex polyhydroxy polyether resins used in this invention are prepared by mixing at a temperature of about 50° C. to about 120° C. the resin with water having dissolved or dispersed therein an anionic or nonionic dispersant, agitating the mixture to form a dispersion having a particle size of about 1 to about 50 microns, and cooling the dispersion below the melting point of the resin. In one variation of this process, the complex polyhydroxy polyether resin is heated to its molten stirrable state, an aqueous solution of the dispersant is slowly added to the molten resin with agitation, agitation is continued until a dispersion of the desired particle size is obtained, and the dispersion is then reduced with water to the desired solids content and cooled. If the softening or melting point of the resin is extremely high, a small amount, up to about 10 percent by weight, based on the weight of the resin, of a solvent for the resin can be added. Such solvents can be water soluble or water insoluble. Examples of such solvents are ethylene glycol monomethyl ether, ethylene glycol monoethyl ether, ethylene glycol monoethyl ether acetate, diethylene glycol monobutyl ether, xylene, toluene and the like. If the aminoplast or phenolplast resin is to be incorporated into the dispersion during the dispersion, depending on the dispersing temperature and the reactivity of the resin, it can be added at the molten resin stage, at the "taffy" stage, i.e., when water and molten resin are first mixed, or at any stage during the agitating and dispersing steps.

In another variation, the polyhydroxy polyether resin, either in molten form or crushed to a fine size, 8 to 20 mesh, U.S. Standard Sieve, can be slowly added to a heated (temperature range of about 50° C. to 120° C.) agitated aqueous solution of the dispersant. Agitation and heating are then continued until the desired particle size dispersion is obtained.

In still another variation, a small amount of the resin can be heated above its melting point and then "taffied" with water and dispersant. The remainder of the resin can then be added in crushed form, followed by heating and agitation to form the dispersion.

Complex polyhydroxy polyether resins can be prepared, as described in U.S. Pat. No. 2,615,007, by reacting epichlorohydrin with an aqueous solution of the sodium salt of a dihydric phenol. After the condensation and dehydrohalogenation reaction is completed, the salt of reaction is washed out by a "taffy" wash process. After all the salt is removed, the "taffy" is then heated to drive out the water and dry the resin. At the taffy stage, dispersant and water can be added to the "taffy" to form the dispersion of this invention, thus avoiding a costly drying step.

In order to operate at temperatures above the boiling point of water, the dispersion process can be conducted under pressure. However, it is preferred to carry out the reaction at atmospheric pressure and, therefore, at an upper temperature limit of 100° C.

In carrying out the dispersion process, the first stage of the dispersion, i.e., the stage before reduction to the final product, is conducted at a solids content of about 65 to about 82% by weight based on the total weight of the dispersion at that stage, and preferably at a solids content of 75 to 80% by weight. After the desired particle size of the dispersion is obtained, the dispersion is reduced to a solids content, based on the total weight of the dispersion, below about 55% by weight. The lower reduction limit will vary depending upon the desired viscosity in the final product, the particle size of the dispersed phase, the presence or absence of protective colloid and the amount of protective colloid. Generally, the solids content is not reduced below 20% by weight. Preferably the solids content will vary between about 40 and about 50% by weight based on the weight of the dispersion.

The catalysts used in the coating compositions of this invention are adducts of phosphoric acid and glycidyl polyethers of polyhydric phenols made by reacting phosphoric acid and a glycidyl polyether of a polyhydric phenol in the ratio of about 1 mol of phosphoric acid per each glycidyl group of the glycidyl polyether. The glycidyl polyethers are derivatives of epihalohydrins and polyhydric phenols, contain more than one 1,2 epoxide group per molecule and are made by reacting the epihalohydrin and polyhydric phenols in various ratios with or without modifying compounds. The epihalohydrins are epichlorohydrin, epibromohydrin and epiiodohydrin with epichlorohydrin being preferred. The polyhydric phenols include resorcinol, hydroquinone, p,p'-dihydroxydiphenyl propane (commonly referred to as Bisphenol A), 4,4'-dihydroxy benzophenone, 4,4'-dihydroxy biphenyl, p,p'-dihydroxydiphenyl sulfone, phloroglucinol, and low molecular weight novolak resins made by reacting formaldehyde with an excess of a phenol, e.g., phenol, cresol, Bisphenol A, etc. The preferred polyhydric phenols are the dihydric phenols, with the most preferred being Bisphenol A.

The glycidyl polyethers used in making the catalysts can be simple diglycidyl ethers of dihydric phenols, as made by reacting the dihydric phenol with an excess of epihalohydrin, or can be more complex glycidyl ethers/glyceryl ethers made by reacting dihydric phenols with less than 2 molar equivalents of epihalohydrin, or by reacting a diglycidyl ether with additional dihydric phenol.

These glycidyl ethers are selected for structure and properties which make them compatible, in the coating, with the polyhydroxypolyether resins in the dispersion. The epoxide equivalent weights of the glycidyl ethers can vary from about 110 up to about 2400, with the preferred range being about 450 to about 1600. Melting points of these glycidyl polyethers can vary from being liquid at room temperature up to about 150° C.

The phosphoric acid is ortho phosphoric acid and can be utilized in its pure crystalline form or as its hydrate. However, preferably, it is used in its usual commercial form which is referred to as concentrated phosphoric acid and is about 80-90 weight percent acid in water.

The phosphoric acid and glycidyl polyether can be mixed and reacted in any convenient matter. However, in order to control the exothermic reaction and to minimize phosphoric acid/glycidyl polyether polymer formation, the glycidyl polyether is slowly added to the phosphoric acid while heating and agitating the reactants. Preferably both the glycidyl polyether and the phosphoric acid are dissolved in a water miscible solvent and reacted in solution. Examples of such solvents are ethylene glycol monomethyl ether, ethylene glycol monoethyl ether, diethylene glycol monobutyl ether and the like.

The adducting reaction is conducted at room temperature up to about 100° C. and preferably at about 40° C. to about 70° C., for a time sufficient for all of the epoxide groups to react with the phosphoric acid. When the adducting reaction is complete, the adduct is dispersible in ammonia or amine water.

In preparing the coating compositions of this invention, the phosphoric acid/glycidyl polyether adducts are added to the aqueous dispersion of polyhydroxy polyether resin and aminoplast resin in organic base salt form and, preferably, as an aqueous solution or dispersion of the salt. The salts are formed by adding about 1 equivalent of ammonia or amine to each acid hydrogen atom on the adducted phosphoric acid. Amines that can be used include ethylamine, propylamine, diethylamine, dipropylamine, triethylamine, tripropylamine, tributylamine, morpholine, diethanolamine, triethanolamine and the like. The preferred amines are tertiary amines. The preferred base is ammonia used in ammonia hydroxide form. Sufficient organic base is added to salt enough acid hydrogens to raise the pH above 7. This amount of base generally will be at least equivalent to the theoretical acid hydrogen content of the adduct but an excess of base up to 2 equivalents per acid hydrogen can be used if desired.

The adducts of phosphoric acid and glycidyl polyethers are readily dispersible in ammonia or amine water and are preferably added to the coating compositions as an aqueous dispersion at a solids content of about 0.3 to about 25 weight percent.

The amount of catalyst used in the coating compositions of this invention is expressed as weight percent phosphoric acid and is the amount of reacted phosphoric acid in the adduct dispersions. This amount of phosphoric will range from about 0.1 weight percent to about 2 weight percent, preferably 0.1 weight percent to 0.5 weight percent, based on the total solids content, excluding pigmentation, if any, of the coating composition.

The coating compositions of this invention can be formulated into clear coatings or pigmented coatings. Pigments can be added during the dispersion processing steps or can be added to the completed dispersion using well known formulating procedures.

Other additives which can be incorporated in the coating compositions are coalescing solvents, leveling agents, wetting agents, dispersions of other resins, water soluble resins, thickening agents, suspending agents, surfactants, defoamers and the like.

The coating compositions of this invention are cured at temperatures of about 150° C. up to about 300° C. for a time sufficient to obtain a cure. These coating compositions are particularly useful as can coatings. In this application, the coatings are applied to the metal substrate (aluminum, tin free steel, tinplated steel, etc.) by roll coat operations or by airless spray to film thicknesses of 0.1 to 0.5 mil (dry film) and are cured by passing the metal through gas fired ovens heated to 600° to 800° F. in stages. The total residence time in these ovens is a matter of seconds, 5–10 seconds, with the coated metal temperature reaching 160°–200° C.

The following examples describe the process of this invention in detail. Parts and percentages where used unless otherwise designated are parts and percentages by weight.

EXAMPLE A

To a suitable reactor equipped with an agitator, thermometer, reflux condenser and dropping funnel were added 34 parts of phosphoric acid (85.5% in water) and 34 parts of diethylene glycol monobutyl ether. To the dropping funnel was added a solution of 200 parts of a glycidyl ether of Bisphenol A, having an epoxide equivalent weight of 674.5, dissolved in 200 parts of diethylene glycol monobutyl ether. Agitation was begun, heat was applied and about half of the glycidyl ether solution in the dropping funnel was added to the reactor. After 16 minutes, the temperature in the reactor was 43° C. and the reactants began to clear up. Slow addition of the remaining glycidyl ether solution was begun. All of the solution was added over a 21 minute period while the temperature rose to 60° C. After heating for 1 hour at 42°–50° C., the resinous adduct was a clear yellow solution and was dispersible in ammonia water. After additional heating at 50° C. for 41 minutes, the reactor contents were discharged to a suitable container. The Gardner-Holdt viscosity at 25° C. of the adduct solution was $Z_3$–$Z_4$.

To 30 parts of the adduct solution were added with agitation 2.31 parts of ammonium hydroxide solution (28% ammonia in water) and 67.69 parts deionized water. This amount of ammonia is equivalent to the theoretical acid hydrogen content of the adduct. A cloudly, opalescent solution or dispersion was formed which had a pH of 7.35 and a Gardner-Holdt viscosity at 25° C. for F.

EXAMPLE B

Using substantially the same procedure as described in Example A, 140 parts of a glycidyl ether of Bisphenol A, having an epoxide equivalent weight of 467, dissolved in 100 parts of diethylene glycol, were reacted with 34.2 parts of phosphoric acid (85.5% in water) dissolved in 74.2 parts of diethylene glycol monobutyl ether. The Gardner-Holdt viscosity of the adduct solution at 25° C. was $Z_2$.

To 30 parts of the adduct solution were added with stirring 3.13 parts of ammonium hydroxide (28% ammonia in water) and 66.87 parts of deionized water. The resulting hazy opalescent solution or dispersion had a pH of 7.5 and a Gardner-Holdt viscosity at 25° C. of $A_1$.

EXAMPLE C

Using substantially the same procedure as described in Example A, 300 parts of a glycidyl ether of Bisphenol A, having an epoxide equivalent weight of 925, dissolved in 300 parts of diethylene glycol monobutyl ether were reacted with 37.2 parts of phosphoric acid (85.5%) dissolved in 37.2 parts of diethylene glycol monobutyl ether. The Gardner-Holdt viscosity at 25° C. of the adduct solution was $Z_4$–$Z_5$.

To 30 parts of the adduct solution were added with stirring 2.30 parts of ammonium hydroxide (28% ammonia in water) and 67.7 parts of deionized water. The resulting cloudy opalescent dispersion had a pH of 8.8 and a viscosity of $Z_3$.

EXAMPLE 1

Part A

To a suitable reactor equipped with a mechanical agitator, thermometer, reflux condenser and dropping funnel were added 547 parts of diethylene glycol monobutyl ether and 120 parrs of cumene hydroperoxide. To the dropping funnel were added 500 parts of styrene, 1200 parts of ethyl acrylate and 300 parts of methacrylic acid. Agitation was begun and about 10% of the monomer solution in the dropping funnel was added to the reactor. Heat was applied raising the temperature to 260° F. After 10 minutes at 260° F., addition of the remaining monomers was begun. This addition was continued to completion over a period of 5 hours and 25 minutes while holding the temperature at 251°–257° F. Heating at 250°–260° F. was continued for about 6 hours to complete the polymerization. The temperature was then lowered to 190° F. and 237 parts of ammonium hydroxide (28% NH₃) were added followed by the addition of 1400 parts of deionized water. The pH was adjusted to 8.85 with 130 parts of ammonium hydroxide. The solids content was 41.8%.

Part B

To a suitable reactor were added 760 parts of the diglycidyl ether of Bisphenol A having an epoxide equivalent weight of 190. Agitation was begun and heating was applied raising the temperature to 122° C. 570 parts of Bisphenol A were added followed by 2.92 parts of dimethyl formamide. The temperature was raised to 193° C. and was controlled at 191°–193° C. for 3 hours and 10 minutes. The reaction product was then poured into an aluminum foil lined tray to cool. The resulting Bisphenol A terminated polyhydroxy polyether resin had a melting point of 119° C. and a Gardner-Holdt viscosity at 25° C. and at 40% solids in diethylene glycol monobutyl ether of W-X. The resin was pulverized to a U.S. Standard Sieve mesh size of 8-20.

Part C

To a suitable reactor equipped with a thermometer and a mechanical agitator were added 120 parts of a protective colloid solution made from 1 part of Carbopol 941 water soluble resin obtained from B. F. Goodrich Chemical Company (a slightly cross-linked polyacrylic acid having an equivalent weight of 75, a specific gravity of 1.41 and a pH of a 1% water solution of 3) 1 part of ammonium hydroxide (28% NH₃) and 98 parts of water 72 parts of hexamethoxymethyl melamine, 75 parts of the surfactant solution described in Part A and 27.9 parts of diethylene glycol monobutyl ether. Agitation was begun and heat was applied raising the temperature to 73° C. Addition of 528 parts of the pulverized resin described in Part B was begun and completed over an 11 minute period while increasing the agitation as the slurry thickened. The temperature was raised to 88° C. and 6 parts of ammonium hydroxide (28% NH₃) were added. Heating at 88° C. and agitation were continued until a smooth white dispersion was formed and the particle size of the dispersion was in the range of 1 to 5 microns, a period of 33 minutes. Deionized water, 574 parts, preheated at 66° C., was then added over a 15 minute period. The dispersion was cooled to 52° C. and was filtered through a nylon bag. The dispersion had a pH of 9.05 and a viscosity, as measured by a #4 Ford cup at 25° C., of 22.2 seconds.

EXAMPLE 2

A number of coating compositions were formulated from the dispersion of Example 1 plus the phosphate catalysts described in Examples A, B and C. The amount of catalyst used was 0.18 and 0.38% actual phosphate content calculated as H₃PO₄ based on the total solids content of the coating composition. A coating composition was also made from the same dispersion using as a catalyst the same amount, on a H₃PO₄ basis, of a 10% solution of diammonium phosphate. Films were drawn down from these 40% non-volatile coating compositions on untreated aluminum panels with a No. 8 Meyer Bar and were baked at 415° F. for 2 minutes. The film cure was then determined by the following tests:

| Solvent Resistance | number of rubs with methyl ethyl ketone (MEK) to affect film. |
| --- | --- |
| Water Resistance | effect as determined by blushing of a 10 minute immersion of the panel in water at 180° F. |
| Wet Adhesion | the percentage of the film area which adheres tightly to a cross-hatched section when tested by tape pull 2 minutes after the panel has been removed from the 10 minute immersion in water at 180° F. |
| Dry Adhesion | dry adhesion is the same test as that for wet adhesion but conducted 2 hours after removal from the water. |

The coating compositions were formulated in gram amounts as follows:

| Example | Dispersion | Catalyst | | | 10% Ag. Diammonium Phosphate | Deionized Water |
| --- | --- | --- | --- | --- | --- | --- |
| | | Ex. A | Ex. B | Ex. C | | |
| 2A | 150 | 13.47 | | | | 8.37 |
| 2AA | 150 | 6.37 | | | | 15.47 |
| 2B | 150 | | 9.88 | | | 11.96 |
| 2BB | 150 | | 4.67 | | | 17.17 |
| 2C | 150 | | | 17.78 | | 4.06 |
| 2CC | 150 | | | 8.40 | | 13.44 |
| 2D | 150 | | | | 3.45 | 18.39 |
| 2DD | 150 | | | | 1.63 | 20.21 |

| Example | Solvent Resist. MEK Rubs | Water Resistance | Film Continuity | Gloss | Wet Adhesion | Dry Adhesion |
| --- | --- | --- | --- | --- | --- | --- |
| 2A | >100 | No Blush | Good | Moderate | 100% | 100% |
| 2AA | " | " | " | " | " | " |
| 2B | " | " | " | " | " | " |
| 2BB | " | " | " | " | " | " |
| 2C | " | " | " | " | " | " |
| 2CC | 4 | " | " | " | " | " |
| 2D | 1 | Severe Blush | " | High | " | " |
| 2DD | 1 | " | " | " | " | " |

EXAMPLE 3

Part A

To a suitable reactor were added 1135 parts of the diglycidyl ether of Bisphenol A having an epoxide equivalent weight of 187, 865 parts of Bisphenol A and 0.4 part of a 45% solution of potassium hydroxide in water. The reactor was flushed with nitrogen, agitation was begun and heat was applied. The temperature was raised to 320° F. where an exothermic reaction began. The temperature peaked at 445° F. in 8 minutes and was held at 390°–395° F. for about 7 hours until a constant viscosity, Gardner-Holdt viscosity at 25° C. of X-Y at 40% solids in diethylene glycol monobutyl ether, was obtained. The resulting phenol terminated polyhydroxypolyether resin had a melting point of 126° C. The resin was pulverized to a U.S. Standard Sieve mesh size of 8-20.

Part B

To a suitable reactor were added 171 parts of the protective colloid solution described in Example 1, 107 parts of the surfactant solution described in Example 1, 103 parts of hexamethoxymethyl melamine and 40 parts of diethylene glycol monobutyl ether. Heat and agitation were applied raising the temperature to 160° F. The addition of the pulverized polyhydroxypolyether resin described in Part A was begun and the addition was completed over a period of 11 minutes with the temperature rising to 168° F. Two minutes later with the temperature at 171° F., 9 parts of ammonium hydroxide (28% NH₃) were added. Stirring and heating to 181° F. were continued for 40 minutes until a smooth dispersion having a particle size range of 1 to 3 microns was obtained. Deionized water, 819 parts, heated to 150° F. was added with stirring. The dispersion was cooled to 145° F. and was filtered through a nylon bag into a container. The dispersion had a #4 Ford Cup viscosity at 25° C. of 16.6 seconds, a solids content of 43.86 and a pH of 9.4.

A coating composition was prepared by blending 150 parts of the dispersion with 13.47 parts of Catalyst A and 8.37 parts of deionized water. Films were drawn down on untreated aluminum panels with a No. 8 Meyer Bar and were baked at 415° F. for 2 minutes. The films were well cured as evidenced by good solvent resistance (MEK > 50), no blush in the water resistance test and no failure on wet adhesion. When baked for 4 minutes at 415° F., no change in film properties were obtained.

For comparison, a coating composition was made from 150 parts of the dispersion, 3.45 parts of a 10% diammonium phosphate solution and 18.39 parts of deionized water. Films prepared as described hereinbefore and baked at 415° F. for 2 minutes were not as well cured as those using the phosphate adduct catalyst. These films failed 5 MEK rubs, exhibited moderate blush after the water resistance test and passed wet adhesion only 50%. On overbake, 4 minutes at 415° F., the water resistance and wet adhesion improved but were still deficient.

EXAMPLE 4

Part A

To a suitable reactor were added 2300 parts of the diglycidyl ether of Bisphenol A having an epoxide equivalent weight of 189. Heat and agitation were applied and at 150° F., 1109 parts of Bisphenol A were added. After 20 minutes heating and with the temperature at 200° F., 146 parts of glacial acetic acid and 5 parts of triphenyl phosphine were added. The temperature was raised slowly at 295° F. where the exothermic reaction began. The temperature peaked at 376° F. in 12 minutes. Heat was applied and continued for 2 and one half hours at 395° F. until a constant viscosity was obtained (Gardner-Holdt at 25° C.) of U-V at 40% solids in diethylene glycol monobutyl ether). After cooling, the acetate terminated polyhydroxypolyether resin was pulverized to a particle size of 8-20 mesh.

Part B

To a suitable reactor were added 566 parts of the polyhydroxypolyether resin of Part A, 5 parts of the surfactant solution described in Example 1, 30 parts of diethylene glycol monobutyl ether, and 39 parts of water. Heat was applied until the resin had melted sufficiently to agitate. When completely mixed and at 190° F., 6 parts of ammonium hydroxide (28% NH₃) were added. After 15 minutes mixing and at 187° F., 77 parts of hexamethoxymethyl melamine were added. When thoroughly mixed, 75 parts of the surfactant solution described in Example 1 were added, followed by the addition of 128 parts of the protective solution described in Example 1. Heating at 165°-175° F. was continued with increased agitation for 50 minutes until a smooth dispersion with a particle size of 1-4 microns was obtained. Water, 574 parts, was added and thoroughly mixed in. The dispersion was cooled and strained through a nylon bag. The resulting product had a pH of 8.6, a solids content of 45.6 and a #4 Ford Cup viscosity at 25° C. of 56 seconds.

A coating composition was prepared by blending 150 parts of the dispersion with 13.47 parts of Catalyst A and 8.37 parts of deionized water. Films were drawn down on untreated aluminum panels with a No. 8 Meyer Bar and were baked at 415° F. for 2 minutes. The films were well cured as evidenced by good solvent resistance (MEK rubs > 50), very slight blush from the water resistance test, and no failure on wet adhesion. When baked for 4 minutes at 415° F., the films exhibited no blush from the water resistance test. When diammonium phosphate was substituted for Catalyst A on the same phosphate content, films, after a 2 minute bake at 415° F., had poor solvent resistance (failed after 5 MEK rubs), they exhibited severe blushing from the water resistance tests, and failed the wet adhesion test 100%. When overbaked, 4 minutes at 415° F., the cure improved slightly.

EXAMPLE 5

Part A

To a suitable reactor were added 900 parts of a glycidyl ether of Bisphenol A, having an epoxide equivalent weight of 3200 and a melting point of 150° C., 60 parts of ethylene glycol monobutyl ether and 100 parts of Pluronic F 98 surfactant (a condensate of ethylene oxide with a condensate of propylene oxide with propylene glycol obtained from Wyandotte Chemical Corporation). Heat was applied to the reactor raising the temperature to 150° C. Stirring was begun as soon as the reactants could be mixed. When the resin was melted and a homogeneous mixture was obtained, the temperature was lowered to 120° C. About 175 parts of water, heated to 60°-70° C. were slowly added over a 15 minute period with agitation while the temperature dropped to 98° C. The particles of resin were elongated with a particle size of 1-10 microns. An additional 25 parts of hot water were added over a 5 minute period while the temperature dropped to 90° C. After holding at 90° C. with stirring, a thick creamy dispersion was obtained having a particle size of 1-10 microns. Deionized water, 749 parts, was added with stirring. The dispersion was cooled to 40° C. and filtered through a nylon bag. The dispersion had a solids content of 50%, a pH of 6.9 and a No. 4 Ford cup viscosity of 19 seconds at 25° C.

Part B

To a suitable reactor were added 1179.2 parts of a butylated melamine formaldehyde resin at 84.8% solids in n-butyl alcohol and 10 parts of Pluronic F-98. Heat was applied and agitation was begun. At 75° C., the components were fluid and well mixed. The temperature was lowered to 40° C. and water, 500 parts, was added slowly over 35 minutes. The resin components were partially dispersed. Additional water, about 220 parts, was added with stirring. After 15 minutes at 40° C., 200 more parts of water were added and stirring was continued for 25 minutes while holding the temperature at 40° C. The particle size of the dispersion was 1-5 microns. An additional 500 parts water were added and the dispersion was filtered through a nylon bag. The resulting dispersion had a pH of 6.2 and a solids content of 45%.

Part C

To a suitable reactor equipped as described in Example A were added 136 parts of phosphoric acid (85.5% in water) and 136 parts of diethylene glycol monobutyl ether. To the dropping funnel were added a solution of 800 parts of a glycidyl polyether of Bisphenol A having an epoxide equivalent weight of 675 and 800 parts of diethylene glycol monobutyl ether. About one-third of the solution in the dropping funnel was added to the reactor. Agitation was begun and heat was applied raising the temperature to 50° C. The remaining solution in the dropping funnel was slowly added while holding the temperature at 50°-60° C. Heating was continued for 4 hours at 60° C. At the end of this heating period, the adduct was dispersible in ammonia water.

A catalyst dispersion was made by blending 30 parts of the phosphoric acid adduct described above, 5.67 parts of triethanol amine and 64.33 parts of deionized water. The nearly clear colloidal solution had a Gardner-Holdt viscosity at 25° C. of $A_4$.

Part D

To a suitable container, 75.6 parts of the dispersion of Part A were blended with 9.3 parts of the dispersion of Part B, 4.2 parts of a 10% solution of Pluronic P-103 in water, 20 parts of a 1% Methocel solution in water, 5 parts of the dispersion of Part C and 5.4 parts of water. The resulting coating composition had a No. 4 Ford Cup viscosity of 15 seconds.

Films were drawn down on detergent washed aluminum with a No. 12 Meyer Bar and were baked at 415° F. for 2 minutes. The coatings were resistant to 38 MEK rubs and passed wet adhesion test 100%. The coatings exhibited slight blushing after 10 minutes in boiling water.

It is to be understood that the foregoing detailed description is given merely by way of illustration and that many variations may be made therein without departing from the spirit of the invention.

What is claimed:

1. In an aqueous dispersion of a heat curable coating composition made from a mixture of a complex polyhydroxy polyether resin derived from an epihalohydrin and a dihydric phenol and having a melting point of at least 50° C. and an aminoplast or phenolplast resin, the improvement which comprises using as a catalyst for the curing reaction an adduct of phosphoric acid and a glycidyl polyether of a polyhydric phenol reacted in the ratio of about 1 mol of phosphoric acid per each epoxide group of the glycidyl polyether wherein the catalyst is present as an organic base salt of the adducted phosphoric acid and wherein about 0.1 to about 2 weight percent phosphoric acid, in the form of the adduct, is present as the catalyst, said weight percent being based on the total solids content, excluding pigmentation, of the coating composition.

2. The composition of claim 1 wherein the adduct is the reaction product of phosphoric acid and a glycidyl polyether of p,p'-dihydroxydiphenyl propane having an epoxide equivalent weight of about 450 to about 1600.

3. The composition of claim 2 wherein the complex polyhydroxy polyether resin is the reaction product of epichlorohydrin and p,p'-dihydroxydiphenyl propane having a melting point of about 90° C. to about 130° C.

4. The composition of claim 1 wherein the aminoplast resin is hexamethoxymethyl melamine.

5. The composition of claim 1 wherein the base is ammonia or a tertiary amine and the adduct is added to the coating composition as an aqueous dispersion.

6. The composition of claim 1 wherein the complex polyhydroxy polyether resin is the reaction product of epichlorohydrin and p,p'-dihydroxydiphenyl propane having a melting point of about 80° C. to about 135° C., the aminoplast resin is hexamethoxymethyl melamine in an amount of about 5 to about 40 weight percent based on the weight of the polyhydroxy polyether resin, the catalyst is the reaction product of phosphoric acid and a glycidyl polyether of p,p'-dihydroxydiphenyl propane having an epoxide equivalent weight of about 450 to about 1600 wherein said adduct is salted with ammonium hydroxide and is in the form of an aqueous dispersion.

* * * * *